United States Patent Office 3,215,760
Patented Nov. 2, 1965

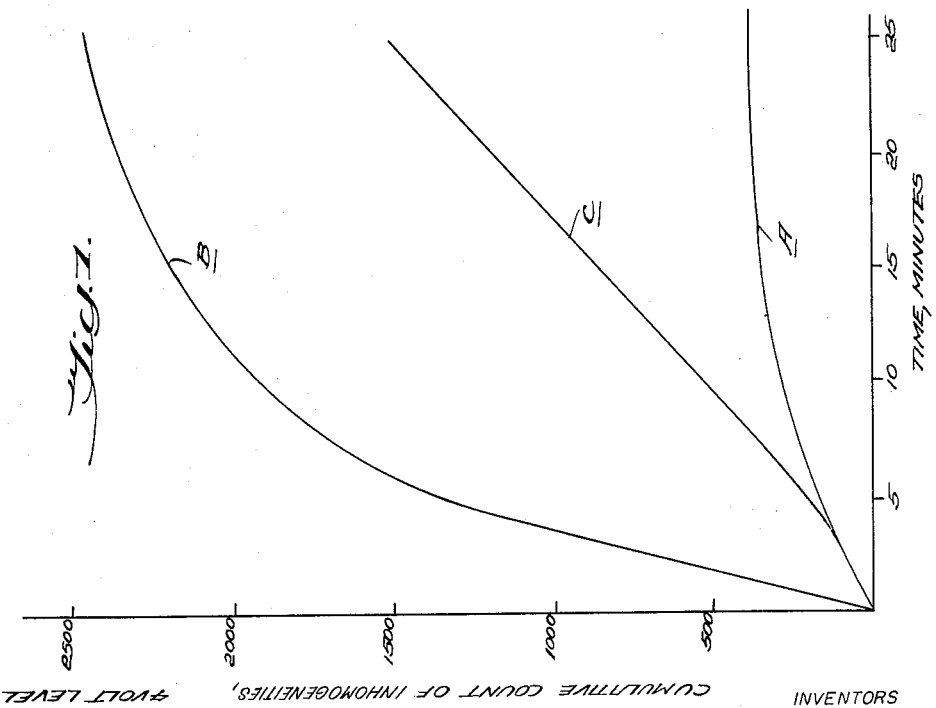

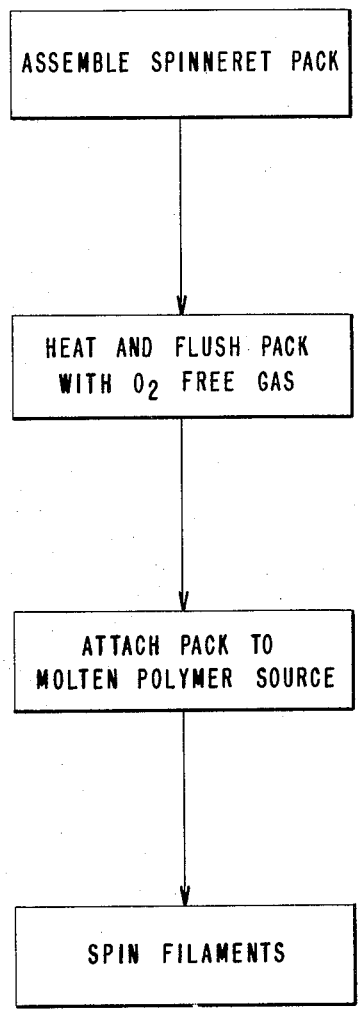

3,215,760
PROCESS OF AVOIDING GEL PARTICLES DURING EXTRUSION BY REMOVAL OF AIR FROM THE FILTER PACK PRIOR TO SPINNING
Harold Padget Grace, Havertown, Pa., and Roman Carl Bieber, Schoenenwerd, Solothurn Canton, Switzerland, assignors to E. I. du Pont de Nemours and Company, Wilmington, Del., a corporation of Delaware
Filed Nov. 27, 1962, Ser. No. 240,294
7 Claims. (Cl. 264—39)

This invention relates to the extrusion of molten polymer to form filaments and the like. More particularly, it is concerned with avoidance of gel particles during the extrusion of synthetic polymers in a melt-spinning process.

As is well known, certain synthetic polymers, particularly polyamides, tend to form gel particles as they are processed in the molten state. These particles may be observed by flow birefringence techniques as will be discussed more fully hereinafter (Example I). If the number of particles in the extruded polymer becomes large, yarn quality is seriously affected.

In order to remove large gel particles or other impurities before molten polymer reaches the spinneret, it is customary to use a suitable filter. Packs containing finely divided inert material such as sand suported by screens and which are particularly suitable for this use have been described in U.S. Patents Nos. 2,266,363 and 2,266,368. Although such packs effectively filter larger gel particles from the polymer, it has been observed that the quality of yarn spun in the period immediately following pack installation is inferior to that of yarn spun subsequently, i.e., the number of small gel particles present in the extruded filaments is relatively high in the period immediately after installation of a new filter pack.

It is accordingly the principal object of this invention to provide for the reduction of gel particles in filaments spun from molten polymer subsequent to the installation of a new filter pack.

The above object is achieved by removing air from the filter pack prior to the introduction of molten polymer and by keeping the pack free of air as it is filled with the polymer.

The invention will be more readily understood by reference to the drawings. FIGURES 1 and 2 are a series of curves referred to in Example I. In these curves the cumulative count of inhomogeneities is plotted as ordinate versus time in minutes plotted as abscissa. FIGURE 3 is a flow sheet describing the preferred process.

The preferred method of air removal, as shown in FIGURE 3 is to replace it with a medium such as nitrogen, $CO_2$ or gaseous $H_2O$. However, the air may also be removed by creation of a vacuum in the pack. These and other procedures will be apparent from the following descriptions of specific embodiments.

Example I

A tubular filter pack of the type described in U.S. Patent No 2,266,368 is prepared except that the spinneret is replaced with a metal extrusion plate having a single centrally located orifice leading to a 0.5 in. length of glass capillary tubing having a 0.015 in. inside diameter. A thin sintered metal filter disc of 125 microns porosity is placed on the extrusion plate. A 200 mesh screen is then placed on the filter disc, followed by a 0.125 in. depth of 60–80 mesh sand, then a 0.625 in. depth of 100–150 mesh sand and finally another sintered metal filter disc of 125 microns porosity. The diameter of the filter cavity in the pack is 0.1875 in. The pack is then connected to a piston-cylinder extrusion rheometer having an inside diameter of 0.375 in. and a capacity of 6 ml. The entire assembly is then heated to 285° C. With the piston removed, the cylinder is sealed and dry nitrogen is forced through the cylinder and filter pack at a velocity of 30 centimeters per second for a period of 30 minutes. Polyhexamethylene adipamide flake prepared in the conventional manner and having a relative viscosity of 45 is compressed into cylindrical shape, inserted into the rheometer cylinder under a blanket of nitrogen and held for seven minutes under several hundred pounds piston pressure to permit melting and equilibration before extrusion. The molten polymer is then extruded through the orifice and capillary tubing, 4–5 ml. of polymer being extruded over a period of 20–25 minutes. The number of gel particles in the polymer extruded through the capillary tube is counted by passing a beam of polarized light through the tubing, then through a second polarizer turned at right angles to the first polarizer. If there are no birefringent gel particles present in the polymer, then no light will be transmitted by the second polarizer. However, with each gel particle, a pulse of light is transmitted because the particle is more oriented and consequently more birefringent than the remainder of the polymer. These light pulses are transmitted to a multiplier phototube by means of a suitable lens and slit. The phototube is connected to an electronic system comprising an amplifier, adjustable discriminators and counters for totalizing the pulses. The discriminators are arranged so that the dials read directly in volts and may be set so that only those light pulses above a given intensity, as expressed in volts, will be counted. In order to minimize background birefringence from the polymer itself, the polarizers are arranged with their respective axes perpendicular and parallel to the capillary axis. FIG. 1, Curve A, shows the cumulative gel count obtained over a period of about 25 minutes at a level of 4 volts. Similarly, curve A in FIG. 2 shows the cumulative count at a level of 64 volts. The voltage level is related to the size of the gel particle, the larger particle giving light pulses of greater intensity and a correspondingly high voltage level. The gel particles detected are estimated to be in the range of 10 to 80 microns in diameter. For comparison, tests are made in which the rheometer is purged with nitrogen, but not the filter pack. Results of these tests are shown by curves B in FIGS. 1 and 2. Similarly, comparisons are made with no sand in the pack, the results being shown by curves C of FIGS. 1 and 2. The differences in gel count at both low and high voltages (indicative of small and relatively large particles, respectively) are apparent from comparisons of curves A and B in FIGS. 1 and 2.

Example II

A nylon spinning pack having a sand cavity of 45 ml. volume and a 34-hole spinneret plate is assembled. The sand cavity is filled with sand supported on screens in the conventional manner. The assembled spinning pack is then clamped between two metal plates, each having a pipe connection for the passage of nitrogen to, through and from the pack interior. Appropriate connections are made inside a muffle furnace wherein the pack is simultaneously heated to 300° C. and flushed with nitrogen under 20 lbs. pressure for 90 seconds. The pack is removed from the furnace and connected to a spinning machine in the conventional manner. Molten 6—6 nylon having a relative viscosity of 45 and which has been protected from the atmosphere is passed through the pack and extruded to form 70 denier, 34-filament yarn which is drawn and twisted on a drawtwister in the conventional manner. The yarn spun from packs flushed with nitrogen prior to extrusion is observed to be of the same quality during the first 12–16 hours of spinning as that spun subsequently while yarn from packs which are not flushed was of lower quality during the first 12–16 hours. In this respect, comparisons of yarn from flushed and unflushed packs during the first 12 hours subsequent to pack installation shows that the flushed pack yield yarn having an average of 8 defects per million yards and 0.010 drawtwister breaks per pound while yarn from unflushed packs has an average of 15 defects per million yards and 0.015 drawtwister breaks per pound.

*Example III*

A spinning pack is assembled and the sand cavity filled, as in Example II. The pack is then filled with water and heated to 300° C., thus vaporizing the water and removing air from the pack prior to connection to the polymer supply. Molten 6—6 nylon is then extruded through the pack to form 70-denier, 34-filament yarn, as described in Example II. The improvement in quality of the yarn during the first 12 hours of spinning subsequent to installation of a new pack is substantially the same as observed for the nitrogen flushed packs of Example II.

*Example IV*

A spinning pack is assembled, as in Example II, and a small amount (approximately 5 g.) of Dry Ice (solid carbon dioxide) is added to the cavity. The pack is placed in a pre-heater (muffle furnace), heated to 300° C. and maintained at that temperature for a period of three hours. The Dry Ice sublimes, displacing air from the sand cavity. The pack is then connected to a spinning machine in the conventional manner and spinning of 70-denier, 34-filament yarn proceeds, as described in Example II. In another test, the Dry Ice is added after pre-heating, just prior to pack installation. Both of these methods give quality improvements of the same order as those described in Example II. Also, inspection of yarn spun within the first few minutes after installation of a $CO_2$-treated pack shows it to be substantially whiter than similar yarn extruded from an unpurged pack.

The foregoing examples illustrate the advantage of this invention in reducing the gel content of molten polymer in the period following installation of a clean spinning pack. This reduction in gel formation by removal of air from the pack is unexpected since the amount of polymer in contact with the air interface as the polymer passes through the pack is relatively small and is normally discarded in the form of waste. It is theorized that gel count is reduced by first removing oxygen-containing air from the rather large surface area of the finely divided inert material used in the filter.

Removal of air from the spinning pack may be accomplished by the application of a vacuum or by flushing with an oxygen free gas which does not react with the polymer employed. In addition to those exemplified, other suitable gases include helium and oxygen free gases obtained by burning propane, butane or other suitable combustible gases in air.

While this invention is particularly useful in connection with those spinning packs in which the filter medium is a finely divided inert material such as sand, it may be applied to any spinning pack or filter cartridge containing a filter medium of large surface area.

Since it is customary to pre-heat filter packs which are used for the extrusion of molten polymers, the removal of air is preferably accomplished during or after heating to avoid any possibility of air diffusing into the pack before it is used. However, this is a matter of convenience and the packs may be flushed with a suitable gas or otherwise treated to remove the air while they are cold if desired.

While the present invention has been exemplified with 6—6 nylon, it may be applied to advantage in the extrusion of any synthetic polymer which tends to form gel particles on exposure to oxygen, e.g., practice of the invention may be desirable in the extrusion of polyamides such as those disclosed in U.S. Patents Nos. 2,071,250, 2,071,251, 2,071,253, 2,130,523, 2,130,948, 2,163,636, 2,241,321, 2,241,322 and 2,241,323.

Having thus described the invention, what is claimed as new and desired to be secured by Letters Patent is:

1. A process including the steps of assembling a spinning pack containing a particulate filtering medium and pre-heating the pack, the improvement of which comprises removing air from the pack preparatory to its installation in a spinning machine.

2. The process of claim 1 wherein air is removed by flushing the pack with a gaseous, oxygen-free medium.

3. The process of claim 1 wherein air is removed by flushing the pack with a gaseous medium selected from the group consisting of nitrogen, carbon dioxide and steam.

4. The process of claim 1 wherein air is removed by flushing the pack with nitrogen.

5. A process comprising the steps of: assembling a spinning pack containing a particulate filtering medium; connecting the pack to a source of nitrogen, in an oven; and pre-heating said pack while flushing it with nitrogen.

6. A process comprising the steps of: assembling a spinning pack containing a particulate filtering medium and a spinneret plate; placing a small amount of Dry Ice inside the pack; and pre-heating the pack in an oven.

7. In a melt-spinning process, the steps of: assembling a pack containing a particulate filtering medium and a spinneret plate; pre-heating the pack; flushing the pack with a gaseous, oxygen-free medium; attaching the pre-heated, flushed pack to a source of pressurized, molten polymer; and spinning filaments of said polymer through said plate.

References Cited by the Examiner

UNITED STATES PATENTS

| | | | |
|---|---|---|---|
| 2,266,363 | 12/41 | Graves | 18—8 |
| 3,056,163 | 10/62 | Deis | 264–169 |
| 3,071,808 | 1/63 | MacKinnon | 18—8 |
| 3,129,272 | 4/64 | Ferrier et al. | 18—8 |

FOREIGN PATENTS

| | | |
|---|---|---|
| 901,398 | 7/62 | Great Britain. |
| 913,615 | 12/62 | Great Britain. |

ALEXANDER H. BRODMERKEL, *Primary Examiner.*

MORRIS LIEBMAN, *Examiner.*